United States Patent [19]

Duke et al.

[11] 3,936,562

[45] Feb. 3, 1976

[54] FIRE RETARDANT FABRICS

[75] Inventors: Marshall W. Duke; Razmic S. Gregorian, both of Aiken, S.C.

[73] Assignee: United Merchants and Manufacturers, Inc., New York, N.Y.

[22] Filed: Jan. 21, 1974

[21] Appl. No.: 434,783

Related U.S. Application Data

[63] Continuation-in-part of Ser. No. 222,681, Feb. 1, 1972, abandoned.

[52] U.S. Cl. ............... 428/277; 427/354; 427/382; 427/412; 427/439; 428/278; 428/921
[51] Int. Cl.$^2$ ...................... C09K 3/28; C09D 5/18
[58] Field of Search .... 117/136, 137, 139.4, 143 A, 117/62.2; 252/8.1; 106/15 FP; 8/116 P; 428/277, 278, 391; 427/354, 382, 412, 439

[56] References Cited
UNITED STATES PATENTS

| | | |
|---|---|---|
| 2,809,941 | 10/1957 | Reeves et al. ................. 117/145 X |
| 2,911,326 | 11/1959 | Haney et al. .................... 117/139.4 |
| 2,992,138 | 7/1961 | Bacon ............................. 117/139.4 |
| 3,067,062 | 12/1962 | Etzel ............................ 117/139.5 A |
| 3,096,201 | 7/1963 | Coates et al. ...................... 117/62.2 |
| 3,632,297 | 1/1972 | Sello .............................. 117/136 X |
| 3,698,854 | 10/1972 | Donaldson et al. .............. 117/137 X |

*Primary Examiner*—Harry J. Gwinnell
*Attorney, Agent, or Firm*—Michael A. Caputo; John P. McGann

[57] ABSTRACT

A process for rendering cellulose and cellulose containing fabrics fire resistant by first impregnating the fibers with an aminoplast resin and polymerizing the resin while the fibers are wet and swollen. Thereafter, the fabric is impregnated with tetrakis (hydroxymethyl) phosphonium hydroxide, cured, washed and dried. The fabric obtained from this process possesses high fire-retardency values, soft hand, and tensile values similar to that of the untreated fabric.

12 Claims, No Drawings

FIRE RETARDANT FABRICS

CROSS-REFERENCES TO RELATED APPLICATIONS

This application is a continuation-in-part of our co-pending application, Ser. No. 222,681, filed Feb. 1, 1972, now abandoned, the contents of which are incorporated herein by reference.

BACKGROUND OF THE INVENTION

1. Field of the Invention

This invention pertains to the field of fire retardant textile fabrics. More particularly, this invention concerns a method of treatment of cellulose-containing fabrics to impart fire-retardancy thereto.

2. Description of the Prior Art

Numerous methods for treating cellulosic containing fabrics to render such fabrics fire-retardant have been suggested. Generally, these methods reside in the impregnation of the fabric with a fire retardant chemical.

One of the best known fire retardant chemicals, particularly for use with cellulose derived textiles, has been tetrakis (hydroxymethyl) phosphonium chloride, commonly abbreviated THPC. This chemical has been used in a variety of modes and procedures including one and two stage processes in conjunction with nitrogen containing compounds, such as, aminoplast resins. (See, for example, U.S. Pat. Nos. 3,421,923 and 3,556,840.)

All of these type processes possess one or more disadvantages, such as, for example, undesirable fabric stiffness or poor hand, poor durability of the fire retardant finish after washing, and reduction in tensile strength and tear strength of the treated fabrics. Additionally, certain of the processes known heretofore result in undesirable chemical deposits on the fabrics.

SUMMARY OF THE INVENTION

We have discovered a new method for rendering a cellulosic textile fabric fire retardant whereby the resulting fabric possesses not only durable fire-retardancy, but also a soft hand and tensile properties similar to those of the untreated fabric.

The present process is carried out by impregnating the fibers of a cellulose-containing fabric with an aminoplast resin, polymerizing or hardening the resin in the impregnated fabric while the fibers thereof are in a wet and swollen state, thereafter adjusting the pH of the fabric to a value greater than about 7.0, impregnating the fabric with a solution of tetrakis (hydroxymethyl) phosphonium hydroxide and then curing, washing and drying the impregnated fabric.

The process of the present invention may be conveniently carried out commercially and avoids the disadvantages of prior aat processes described hereinabove.

DESCRIPTION OF THE PREFERRED EMBODIMENT

The present process can be used for treating all types of cellulose-containing fabrics, such as, those made from cotton fibers, regenerated cellulose, jute, manila, hemp, sisal, and ramie. The process is especially useful for the treatment of cotton fabrics for clothing materials, tents and awning materials. Generally, the process of the present invention and the products obtained therefrom are advantageous in those cases where cellulose-containing materials are exposed to the danger of fire and wherein, in addition to high flame resistance, high mechanical strength after repeated washing is required.

Preferably, the fabrics used in the present process possess a cellulose content of at least about 65% by weight of the total fabric.

In accordance with the present invention, the fabric is first impregnated with a water soluble, hardenable aminoplast. Such an impregnation can be carried out by methods well known to the art such as dipping or padding, with padding being preferred. Preferably, the amount of aminoplast applied to the fabric is in the range from about 2 to 25%, and most preferably from about 8 to 18% based upon the weight of the fabric.

Water soluble, hardenable aminoplasts suitable for use in the present process primarily include hardenable aminotriazine resins that are soluble in water or possess limited solubility in water and which may be etherified. Such aminoplasts are obtained by methods well known in the art, such as, the condensation of formaldehyde with melamine, acetoguanamine, benzoguanamine, or formoguanamine. Mixtures of such condensation products are also suitable. Particularly preferred condensation products are those of 2–3 moles of formaldehyde with one mole of melamine.

Those condensation products of limited water-solubility are colloidal intermediate products which are first produced on further condensation beyond the crystalline methylol stage. They are characterized in that they are precipitated from the concentrated aqueous solution by the addition of water (see Kolloid-Zeitschrift, Vol. LVII, October-December 1931, page 233).

The completely water-soluble condensation products may be applied in the form of aqueous solutions. The condensation products of limited solubility may be used either in the form of solutions of the solubilized condensation products, i.e., those made soluble with acids, or in the form of emulsions.

Generally, the solution or emulsion contains hardening catalysts, such as, acids, including hydrochloric acid, sulfuric acid or formic acid. Alternatively, salts of strong acids with weak bases, such as, ammonium salts of strong inorganic or organic acids, e.g., ammonium chloride, ammonium sulfate, ammonium nitrate, ammonium oxalate, and ammonium lactate can be used. When solutions of aminoplasts containing acids are used, such solutions must be freshly prepared inasmuch as, on standing the solutions undergo changes which render them unsuitable for use in the present process.

Another suitable class of catalysts is water-dispersible oxidizing agents which when in aqueous phase do not possess either strong alkali-or acid binding properties and which exert an accelerating effect on the polymerization of the aminoplast due to the formation of oxidation products.

As an oxidizing agent possessing sufficient oxidizing power to oxidize formaldehyde to formic acid at elevated temperatures or during long storage of the treated fabric, hydrogen peroxide is suitable as are addition products of hydrogen peroxide to certain inorganic or organic compounds, such as, for example, "perborate" $NaBO_2H_2O_2$, or the addition compound of hydrogen peroxide and urea. Another suitable oxidizing agent is chlorine dioxide or its stable addition products especially the addition product of $ClO_2$ to pyridine. The salts of peroxymonosulfuric acid, $H_2SO_5$, and peroxydisulfuric acid, $H_2S_2O_8$, e.g., its alkali salts, are also suitable for use as oxidizing agents.

Following the impregnation step, the aminoplast is polymerized while the fibers are maintained in a wet and swollen state. Such a process is generally termed "wet fixing". This polymerization may be carried out under steam and/or under pressure.

The usual process used for the polymerization is to first remove any excess of the impregnation solution from the fabric as by squeezing or centrifugation. The fabric is then stored in a closed chamber such that the fabric remains wet for the entire period of storage. The storage time depends on the temperature of the storage. Thus, for example, the storage may be carried out for one minute if steam is used to control temperature, i.e., direct application of steam to the fabric: for 15 minutes if the storage temperature is 85°: and for 20–24 hours if the temperature is room temperature. It is critical, however, that the fabric not be allowed to dry during the storage period. Thus, it may also be necessary to control the humidity of the storage chamber.

Specific methods for such wet fixing are well known in the art (see for example *Textile Research Journal*, pages 44–64, January, 1971: Bullock, J.B. and Welch C.M. Textile Research Journal 35, pages 459, 471, 1965; and U.S. Pat. No. 3,434,875).

We have also found that certain fire retardant materials may be added to the aminoplast impregnation solution. Thus, for example, when treating blends of cotton with polyester, we have found it particularly desirable to include an organic halogenated phosphorus containing ester in the solution. Suitable esters of this type include compounds selected from the group consisting of organic phosphorous containing esters having the general formula

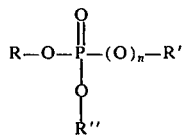

wherein R, R', and R'' can be the same or different and may be a halogenated lower alkyl group having from 2 to 8 carbon atoms, and from 1 to 7 halogen atoms, a nucleus selected from the phenyl series which is substituted with 1 to 5 halogen atoms, a nucleus selected from the napthyl series which is substituted with 1 to 7 halogen atoms, a lower alkyl phenyl group wherein the alkyl group contains from 1 to 5 carbon atoms, and the phenyl group is substituted with from 1 to 4 halogen atoms, and n is zero to 1. Preferably, the halogen is Cl or Br.

Illustrative of such compounds are tris (2,3-dibromopropyl) phosphate, tris 2-(1,3-dibromopropyl) phosphate, tris (chloroethyl) phosphate, tris (2-bromo-3-chloropropyl) phosphate, tris 2-(1,3-dichloropropyl) phosphate, bis (2,3-dibromopropyl)-2,3-dibromopropyl phosphonate, tris-(2,6-dichlorophenyl) phosphate, tris-(p-bromophenyl) phosphate, tris-(2,3,4-tribromobutyl) phosphate, tris-2-(1,6-dibromonaphthyl) phosphate, bis (chloroethyl) phenyl phosphonate, tris-(2-bromo-4-methylphenyl) phosphate, and the like.

We have found it preferable to include the organic halogenated phosphorus containing ester in a concentration in the range from about 5 to 25 weight percent and, most preferably, from about 10 to 18 weight percent of the solution.

Such solutions are particularly useful for treating fabric composed of a blend of from about 20 to 80 weight percent polyester content, the remainder of the fabric being cellulosic derived fibers.

After the polymerization is complete, the pH of the fabric is adjusted to a value of greater than about 7.0 and preferably, from about 8.5 to 9.6.

This pH adjustment may be carried out by treating the fabric with a solution of alkaline material. Particularly preferred is a solution of sodium bicarbonate although other materials, such as, sodium carbonate, sodium hydroxide, potassium hydroxide, and sodium silicate may be used.

We have found that the pH adjustment step is particularly critical to provide a fabric having a soft hand and desirable levels of tensile strength. Thus, if the pH of the fabric is allowed to remain below the value of 7.0, and the fabric is then subjected to the subsequent treatments described herein, the optimum physical properties will not be obtained in the end product.

After the ph adjustment step, the fabric may be dried if desired. However, this drying step is optional.

The fabric is then impregnated with a solution of tetrakis (hydroxymethyl) phosphonium hydroxide in water or alcohol, e.g., methanol, isopropanol, etc., and mixture thereof. This material may be applied to the fabric from a solution by known methods such as dipping, padding, spraying, etc.

Generally, the solution of the tetrakis (hydroxymethyl) phosphonium hydroxide has a concentration in the range from about 10 to 35 weight percent and preferably in the range from about 16 to 26 weight percent. In any event, sufficient solution is applied to the fabric to produce a final phosphorus content in the resulting fabric of from about 1 to 3 percent and preferably from about 1.4 to 2.0 percent based on the total weight of the fabric.

In addition to the tetrakis (hydroxymethyl) phosphonium hydroxide, the solution may also contain urea as well as other nitrogenous compounds capable of reacting with the hydroxy methyl(methylol) group. These may be in quantities from about 1 to 20 weight percent and preferably from about 1 to 10 weight percent. Typical examples of materials are ethylene urea, propylene urea, guanidine, dicyandiamide, oxamide, thiourea, polyethylene imines, and the like.

After application of the tetrakis (hydroxymethyl) phosphonium hydroxide solution, the fabric is subjected to a curing step. Generally, the fabric is cured at a temperature ranging from about 300° to 400°F for a period of time from about 2 to 20 minutes. Typically, in plant practice, a 4 to 8 minute cure at about 360°F would be used.

A major advantage of the present invention is evident in the curing step. Thus, with the present invention, a very "hard" cure can be used without suffering appreciable loss of softness, tensile strength, or fabric whiteness. Additionally, as the temperature and time of the cure are increased, the efficiency of phosphorus fixation in the fabric is increased.

After curing, the fabric is backwashed to remove any residual deposits including any soluble and/or unreacted material. Thereafter, the fabric is dried in a manner well known in the art.

The fabric is then subjected to a peroxidation step in order to eliminate any possible odor when the fabric is wet and to avoid losses in fire-retardancy when the fabric is exposed to sunlight. The peroxidation step involves treatment with an oxidant, such as, for example, hydrogen peroxide or sodium perborate. The peroxidation may be carried out at elevated temperatures in a continuous process, such as, in an "open soaper" or batchwise in a dye beck. Alternately, the oxidant may be padded onto the fabric while cold, followed by holding the fabric in a wet state for from about 0.5 to 18 hours and then rinsing the fabric. Such peroxidation methods are conventional in the art and the particular method used is not critical to the present invention.

The resulting fabric possesses a soft hand, durable fire-retardancy and tensile properties similar to those of the fabric prior to treating. Such fabric is characterized by a phosphorus content in the range from about 1 to 3 percent by weight and a nitrogen content in the range from about 3 to 6 percent by weight, all weights being based on the weight of the fabric.

The following examples illustrate our invention:

In the examples, the following analyses were used:

Nitrogen was determined by the Kjeldahl method as set forth in "Analytical Methods for a Textile Laboratory", Second Edition, American Association of Textile Colorists and Chemists, page 155.

Phosphorus was determined by the methods set forth in "Organic Functional Group Analysis by Micro and Semi-Micro Methods", Cheronis and M. A. Wiley, 1964, pages 551–554.

Fabric hand was determined by subjective evaluation of two or more qualified fabric examiners. Stiffness was determined by ASTM method D 1388-64.

Tensile strength was measured by the Grab tensile method (ASTM D 1682-64).

Fire retardancy was measured by Department of Commerce DOC, FF 3-71 or AATCC 34-1969.

EXAMPLE 1

A 100% cotton flannel was impregnated by padding with 16% by weight methylated trimethylomelamine, 1% hydrochloric acid, and 83% water. The fabric was then wrapped in a moisture-proof plastic bag and allowed to stand at room temperature for 20 hours.

The pH of the fabric was then adjusted to 9.0±0.5 by dipping in a 1.0% soda ash solution and the fabric was then dried.

A solution of tetrakis (hydroxymethyl) phosphonium hydroxide (26% solids) and urea (10% solids) was padded onto the dry fabric to 100% pick up. The tetrakis (hydroxymethyl) phosphium hydroxide was prepared by neutralizing tetrakis (hydroxymethyl) phosphonium chloride with sodium hydroxide to a pH of 7.5–8.0.

Thereafter the fabric was dried at a temperature from about 240°–270°F, and then cured for 4 minutes at 360°F.

The cured fabric was padded with a solution of 1.0% hydrogen peroxide, 0.2% sodium carbonate, and 0.1% of a wetting agent. The fabric was then held in the wet state for 4 hours, rinsed with hot water, rinsed with cold water, squeezed and dried.

The fabric obtained was durably fire retardant, possessed a soft hand, and possessed a tensile strength only slightly less than that of the starting fabric.

EXAMPLE 2

A plain weave fabric composed of 50% polyester and 50% cotton having a weight of 3.3 ounces per square yard was impregnated with a solution composed of 15% (solids) of methylated trimethylol malamine resin, 12.5% (solids) of emulsified tris (dibrompropyl) phosphate and 1% hydrochloric acid. The fabric was maintained in the wet state at room temperature for 20 hours. Thereafter it was dipped in a 1% soda ash solution, rinsed and squeezed until the fabric pH was 7.5–8.0 and then dried.

A solution of 16% tetrakis (hydroxymethyl) phosphonium hydroxide and 7.5% urea, prepared as described in Example 1, was padded onto the fabric. The wet fabric was dried at 260°–280°F and cured for 4 minutes at 360°F. The cured fabric was oxidized, rinsed, and dried in accordance with the procedure set forth in Example 1. The resulting fabric was fire retardant and possessed a soft hand.

Variations can, of course, be made without departing from the spirit and scope of the invention.

Having thus described our invention what we desire to secure and claim by Letters Patent is:

1. A process for rendering a cellulose containing fabric fire retardant comprising:
   a. impregnating the fibers of the cellulose-based fabric with an aqueous aminoplast resin composition, such that the fibers become wet and swollen, in an amount sufficient to produce a resin content in the final fabric in the range from about 2% to 25% by weight based on the total weight of the fabric;
   b. polymerizing the resin in the impregnated fabric while the fibers are in a wet and swollen state;
   c. adjusting the pH of the fabric to a value greater than about 7.0;
   d. impregnating the fabric with a solution of tetrakis (hydroxymethyl) phosphonium hydroxide in an amount sufficient to produce a phosphorus content in the final fabric in the range from about 1% to 3% by weight based on the total weight of the fabric;
   e. subjecting the impregnated fabric to curing conditions consisting essentially of heating the fabric at a temperature in the range from about 300°F to 400°F for a time period from about 2 to 20 minutes; and
   f. washing and drying the fabric.

2. The process of claim 1 wherein the fabric has a minimum cellulose content of about 65 percent by weight.

3. The process of claim 1 wherein in adjustment step (c) the pH is adjusted to a value in the range of about 8.5–9.6.

4. The process of claim 1, wherein in impregnation step (a), the fabric is impregnated with a mixture of an aminoplast resin and an organic halogenated phosphorus containing ester selected from the group consisting of compounds having the general formula

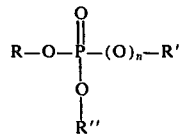

wherein R, R', and R'' can be the same or different and may be a halogenated lower alkyl group having from 2 to 8 carbon atoms, and containing from 1 to 7 halogen atoms, a nucleus selected from the phenyl series which is substituted with 1 to 7 halogen atoms, a lower alkyl phenyl group wherein the alkyl group contains from 1 to 5 carbon atoms, and n is zero or 1, the concentration of said ester being from about 5 to 25% by weight based on the weight of the mixture.

5. The process of claim 4 wherein the halogenated phosphorus containing ester is selected from the group consisting of tris (2,3-dibromopropyl) phosphate, tris 2-(1,3 dibromopropyl) phosphate, tris (chloroethyl) phosphate, tris (2-bromo-3-chloropropyl) phosphate, tris 2-(1,3-dichloropropyl) phosphate, bis (2,3-dibromopropyl)-2,3-dibromopropyl phosphonate, tris-(2,6-dichlorophenyl) phosphate, tris-(p-bromophenyl) phosphate, tris-(2,3,4-tribromobuyl) phosphate, tris-2-(1,6-dibromonaphthyl) phosphate, bis (chloroethyl) phenyl phosphonate and tris-(2-bromo-4methylphenyl) phosphate.

6. The process of claim 4 wherein the fabric consists essentially of at least about 20 percent by weight cellulose, the remainder of the fabric being polyester.

7. The process of claim 1 wherein in impregnation step (a), the fabric is impregnated with a mixture of an aminoplast resin and an organic halogenated phosphorus containing ester selected from the group consisting of tris (dibromopropyl) phosphate, tris (dichloropropyl) phosphate, tris (chlorobromopropyl) phosphate, and di (chloroethyl) chloroethyl phosphonate the concentration of the ester being in the range from about 5 to 25% by weight of the mixture.

8. The process of claim 1 wherein subsequent to the adjustment step (c) and prior to impregnation step (d), the fabric is dried.

9. The process of claim 1 wherein in impregnation step (d), the fabric is impregnated with a solution comprising an aqueous mixture of about 10 to 35% by weight tetrakis (hydroxymethyl) phosphonium hydroxide and about 1 to 20% by weight of a nitrogenous compound selected from the group consisting of urea, ethylene urea, propylene urea, guanidine, dicyandiamide, oxamide, and thiourea.

10. The process of claim 1 wherein subsequent to curing step (e), and prior to washing step (f), the fabric is treated with peroxide.

11. A fire retardant cellulose containing fabric obtained from the process of claim 1.

12. A fire retardant cellulose containing fabric obtained from the process of claim 6.

* * * * *